United States Patent
Davidson et al.

(10) Patent No.: US 6,807,409 B1
(45) Date of Patent: Oct. 19, 2004

(54) SYSTEM FOR ASSOCIATING USER SELECTABLE INFORMATION IN WIRELESS DEVICES

(75) Inventors: Suzie W. Davidson, Dana Point, CA (US); Senthil K. Veluswamy, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 652 days.

(21) Appl. No.: 09/842,601

(22) Filed: Apr. 26, 2001

(51) Int. Cl.[7] ............................................. H04M 11/00
(52) U.S. Cl. ................. 455/406; 455/414.3; 455/412.1; 455/456.3; 379/144.05; 340/539.12
(58) Field of Search ......................... 455/414.3, 414.1, 455/412.1, 406, 456.1–456.3, 456.5–456.6, 550.1; 340/539.12; 3798/114.05–114.07, 144.01–144.08

(56) References Cited

U.S. PATENT DOCUMENTS

| | | | | |
|---|---|---|---|---|
| 5,086,391 A | * | 2/1992 | Chambers | ................. 340/573.1 |
| 5,848,138 A | * | 12/1998 | Sarpola et al. | ........... 379/114.01 |
| 6,198,914 B1 | * | 3/2001 | Saegusa | .................... 455/404.2 |
| 6,405,028 B1 | * | 6/2002 | DePaola et al. | ............. 455/406 |
| 6,480,713 B2 | * | 11/2002 | Jenkins | ..................... 455/412.1 |
| 6,529,593 B2 | * | 3/2003 | Nelson | ...................... 379/114.2 |
| 6,532,282 B1 | * | 3/2003 | Plush et al. | ............. 379/114.03 |
| 6,574,467 B1 | * | 6/2003 | Jonsson | .................... 455/414.1 |
| 6,615,034 B1 | * | 9/2003 | Alloune et al. | .............. 455/406 |
| 6,650,887 B2 | * | 11/2003 | McGregor et al. | ........... 455/406 |
| 2001/0021647 A1 | * | 9/2001 | Kondo et al. | ................ 455/406 |
| 2002/0010000 A1 | * | 1/2002 | Chern et al. | ................. 455/517 |

* cited by examiner

*Primary Examiner*—William Trost
*Assistant Examiner*—Sharad Rampuria
(74) *Attorney, Agent, or Firm*—Farjami & Farjami LLP

(57) ABSTRACT

A system for associating user selectable information to a communication for use in enhanced communication services. On the user side, the communication device may consist of an input mechanism, processor, and memory. The input mechanism accepts user information such as audio, voice, text, graphics, or an image from the user. The processor then uses the memory to associate the user information with a function on the communication device. The user may then activate the function on the communication device to send the user information with a communication. This system allows a user to enter health or other emergency information to be sent during an emergency phone call to services such as the emergency 911 system. It also allows for enhanced communication services such as a billing service or some other communication identification service.

14 Claims, 6 Drawing Sheets

SYSTEM FOR ASSOCIATING USER SELECTABLE INFORMATION IN WIRELESS DEVICES

BACKGROUND OF THE INVENTION

1. Technical Field

This invention relates to wireless telecommunication devices, and specifically to the transmission of preselected information by the user.

2. Related Art

Historically, telephones have conveyed only voice information. Operating with the plain old telephone system (POTS), sometimes in combination with cordless technology, these devices were limited in their physical placement and use. With the advent of increased functionality, cellular telephony and wireless communication devices have increased their performance capabilities expanding their roles and functionality.

SUMMARY

The invention provides a scheme for allowing devices to transmit user information associated with the type of call being made on the communication device. The user information may be pre-selected by the user for transmission upon the occurrence of an anticipated event or may be selected by the user at a specific time. The user information being transmitted may be transmitted using a default mechanism such that all calls made by the communication device are for business purposes. If a function is implemented that overrides the default mechanism, then the call is registered as a personal call. Such a scheme would support separate billing. The user information may also correspond to specific users so that each user has a separate function code supporting billing different individuals who may have access to the communication device.

As one embodiment, the user information may correspond to a particular type of call. For example, when the caller initiates a call to an emergency response center such as a 911 center, prespecified medical user information may be transmitted to aid the emergency response team. In addition, the information user information may be stored and recalled from a memory location in the communication device or stored and recalled from a memory location connected to the communication network.

Other systems, methods, features and advantages of the invention will become apparent to one of ordinary skill in the art upon examination of the following figures and detailed description. It is intended that all such additional systems, methods, features and advantages be included within this description, be within the scope of the invention and be protected by the accompanying claims.

BRIEF DESCRIPTION OF THE DRAWINGS

The components in the figures are not necessarily to scale, emphasis instead being placed upon illustrating the principals of the invention. Moreover, in the figures, like reference numerals designate corresponding parts throughout the different views.

DETAILED DESCRIPTION OF THE PREFERRED EMBODIMENT

Figure 1:
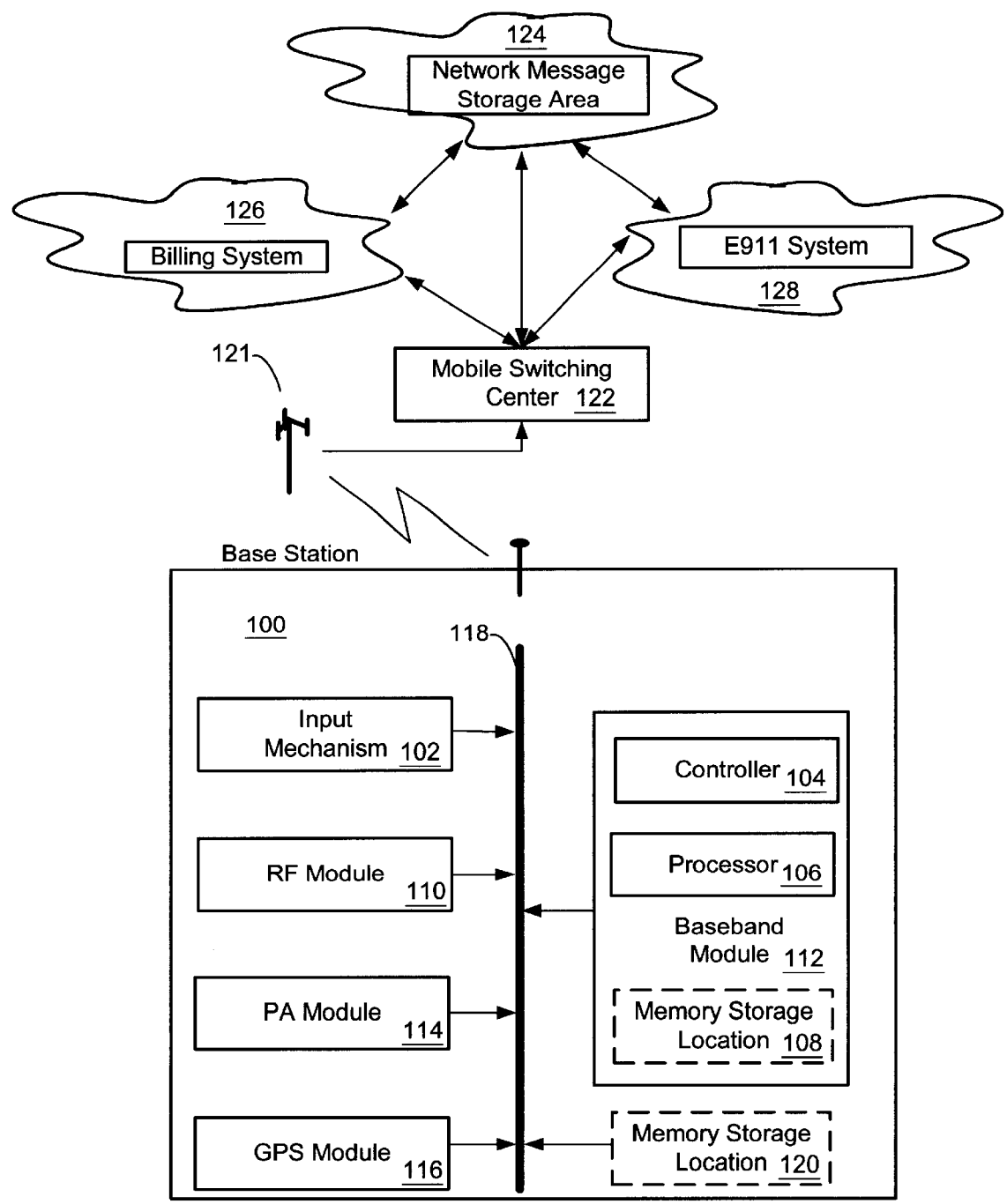
FIG. 1 is a block diagram illustrating a communication system for sending user information to a specific location on the communication network.

The invention provides a system capable of transmitting user information across a communication network. FIG. 1 is a high-level block diagram illustrating implementation schemes enabling the transmission of user information. The communication device 100 may have an input mechanism 102 comprising a key pad, a microphone for speech recognition, a pressure sensitive touch screen thin film transistor (TFT), or some similar device for inputting information (not shown). One purpose of the input mechanism 102 is to provide a mechanism for assisting a user with input of user information into the communication device 100. As such, any manner of input mechanism may be used. In another embodiment, the input mechanism 102 may comprise a separate device linked by a communication pathway to the communication device 100 (not shown).

The communication device 100 also may comprise a memory storage location 108 typically in the form of random access memory ("RAM") located within the baseband processor 112 or RAM located external of the baseband processor (120). The memory storage location 108 may be coupled to a recall mechanism comprising a controller 104 and a processor 106 in communication on a bus 118. The processor 106 may selectively be any general-purpose processor such as an Intel XXX86, Motorola 68XXX or other equivalent processor capable of executing instructions (not shown) from the controller 104. However, typically the processor will be located on the baseband module 112. By way of further example, the processor may be an ARM processor such as an ARM 7 or ARM 9 processor, a ZSP Core supplied by LSI Logic or a Teak processor supplied by DSP Group. It is appreciated that the controller 104 and processor 106 may also be integrated into the single baseband module 112 such as an Application Specific Integrated Chip "ASIC" or Reduced Instruction Set Computer "RISC," or may be implemented via a Digital Signal Processor (DSP) chip. An example of a communication device specific circuit or oriented device includes the RF142 Heterojunction Bipolar Transistor Power Amplifier Dual-Band Controller for GSM and PCS Applications available from Conexant Systems, Inc., or the MC68EZ328: DragonBall™ EZ Integrated Processor from Motorola that includes an integrated controller.

The processor 106 typically receives user information obtained from the input mechanism 102 and associates it with a function chosen by the user on the communication device 100. (See FIG. 2.) It is appreciated that if the processor 106 and controller 104 are integrated into a single baseband module 112, the baseband module 112 associates the user information obtained from the input mechanism 102 with the function chosen by the user. The user information may be sent from the processor 106 to an RF module 110 whose power is modified by the PA module 114 to bring the information up to the proper frequency for amplification by a transmit mechanism such as an antenna for transmission. Location information may also be gathered by a GPS module 116 and sent to the processor 106, memory storage location 108 or to the RF module 110 for eventual transmission.

The communication and user information is then received by the base station 121. The base station 121 sends the user information to a mobile switching center 122 for delivery to a billing system 126, an E911 system 128 or to some other enhanced caller service. In one embodiment, the transmission of a particular type of communication allows the user information to be retrieved from a network message storage area 124 for transmission to a desired destination such as a billing system 126, a E911 system 128 or to some other enhanced caller service.

Figure 2:
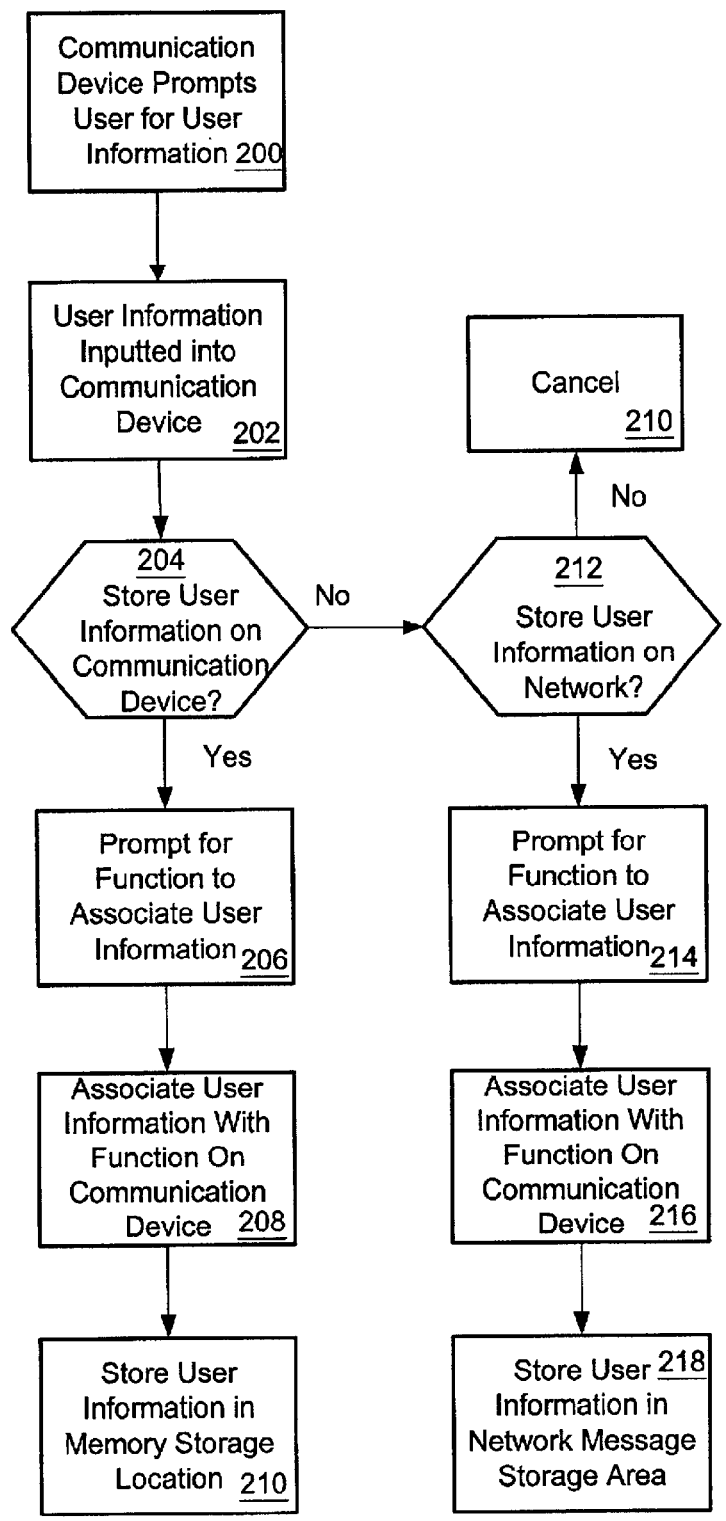
FIG. 2 is a block diagram illustrating a methodology for inputting user information for recall and transmission.

FIG. 2 illustrates implementation schemes for inputting user information into the communication device 100. First, in step 200, the user is prompted for the user information. Next, in step 202, the user inputs the user information into the communication device. In one embodiment, the input mechanism 102 is a keypad and the user inputs the user information via the keypad. The user information may be in the form of a text message or a numeric code corresponding to a look up table of desired messages. The user information may convey such information as data to differentiate between "business calls" or "personal calls;" specific medical information such as blood type, communicable diseases, or specific medical problems such as diabetes. The user information may also assist billing systems such that differentiation may occur between several users of the same communication device.

In an example embodiment, the user information may be entered through the input mechanism by way of voice or other audio input, by an imager device, or through other buttons such as a pressure sensitive screen TFT. In step 204, the user may then select whether to store the user information in a memory location on the communication device or accessible in a memory location on the communication network. This selection step 204 may be done by the user's service provider or as an option for the user. If the user makes the selection to store the user information on the communication device, then in step 206, the user is prompted for a function to associate with the user information. A default procedure may store the user information on either the communication device or on the network. If the user is allowed to select a "NO" response to storing the user information on the communication device, in step 204, and a "NO" response as to whether to store the user information on the network, in step 212, the process moves to cancelled step 210.

If the user selects the "YES" response in step 204, then in step 208, the communication device 100 associates the user information with the function and stores the information into a memory storage location on the communication device 100, in step 210. On the other hand, if the user selects the network storage option, through steps 204 and 212, the communication device 100 may prompt the user for the function to associate with the user information, in step 214. Next, in step 216, the user information is associated with the selected function and stored in a memory location accessible on a network message storage area, in step 218.

Furthermore, the user may enter a call initiating function like a telephone number or voice recognized command that initiates a telephone call. In one embodiment, the user might indicate a reference key function on the communication device 100 to associate with the user information to activate during a pre-established call. In such event, in step 208, the processor 106 then associates the user information with the function and, in step 210, the user information is stored in the memory storage location of the communication device 100. The transmission of the user information may also occur every time a particular type of call is made.

In one embodiment, the input mechanism 102 may comprise a microphone having voice recognition capability to recognize the user's uttered words, such as "call home" or "tag personal" for use by the communication device 100. The word function may be associated with a call initiation feature of the communication device 100 or may simply send the user information during an existing call. In another embodiment, the user may use a pressure sensitive TFT button to identify the function. Although only one discrete input mechanism 102 is required, it may be appreciated that any singular input mechanism or any combination of input mechanisms may be utilized to identify the function.

Figure 3:
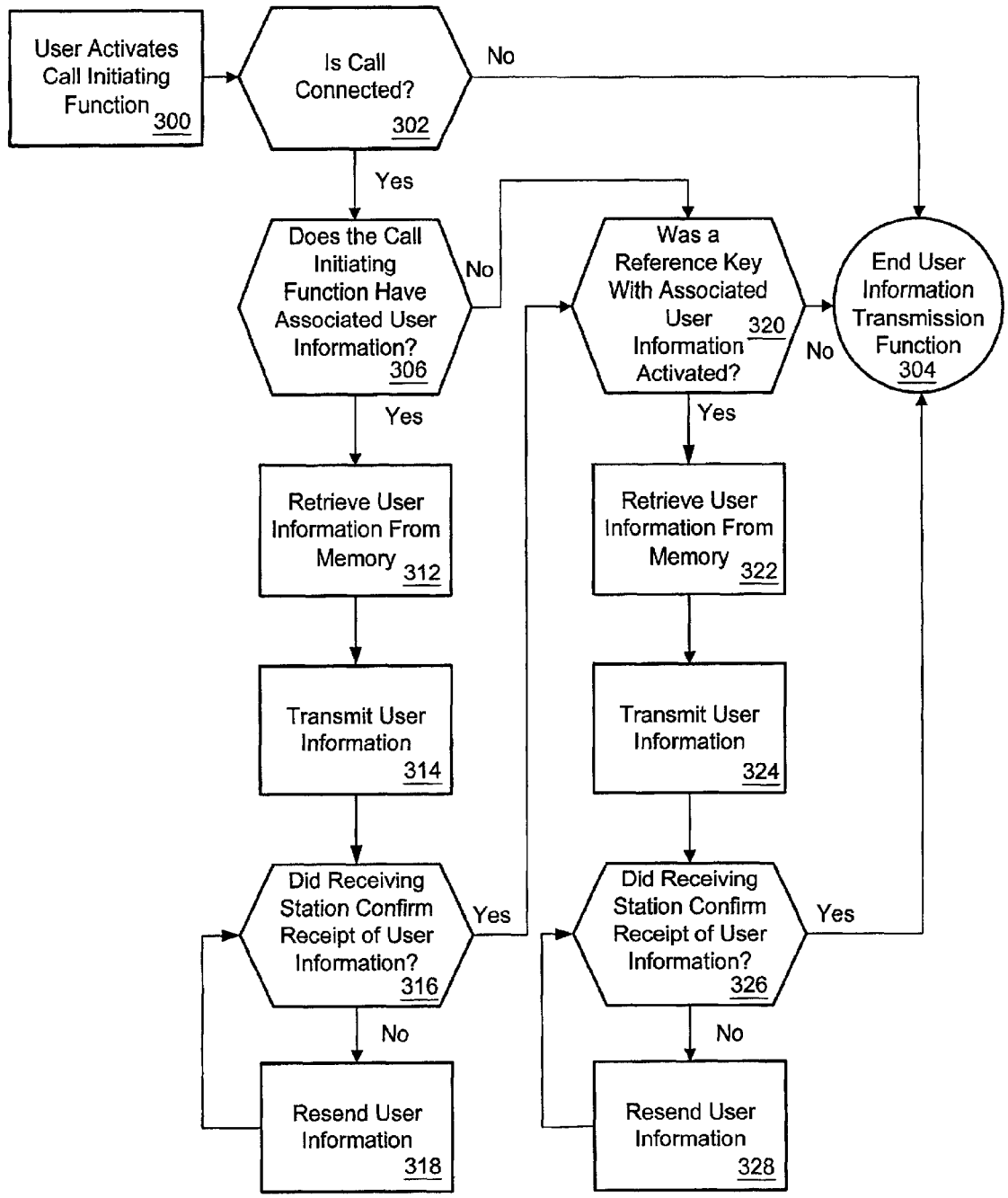
FIG. 3 is a flow diagram for sending user information from the communication device shown in FIG. 1.

FIG. 3 illustrates an implementation of the operation of the communication device 100 utilizing previously stored user information. A user may initiate the call function in step 300 upon initiating a call using the input mechanism 102. The call function may also be initiated by using default settings and activating certain non-default functions by user action. The user may initiate a call by using any of the described embodiments of the interface 102, such as through a key pad function, through a voice recognition function using a microphone or through a display interface function using a TFT device. The connection may also be initiated from an external device. In step 302, it is determined whether the call is or is not connected. If the call is not connected, the user information transmission function is ended and the process moves from step 302 to step 304. If the call is connected, the process moves to step 306 and the function initiating the communication is queried for associated user information. For example, if the voice recognition feature recognizes a command and initiates the call, the command is checked for associated user information in step 306. If the user information is found in step 306, such information is retrieved from memory, in step 312, and transmitted with the call in step 314. In one embodiment, the user information is retrieved from the memory storage location 108 on the communication device 100 and transmitted in step 314. In another embodiment, the user information is retrieved from a network message storage area 124 and directed to the receiving station. The receiving station is polled to confirm receipt of the user information in step 316. If no confirmation is indicated, the user information is sent again in step 318.

Whether or not the user information is associated with the call initiating function in step 306, the user information may be associated with a reference key on the communication device 100 in step 320. If a reference key with associated user information is activated during a call in step 320, the user information is retrieved from the memory in step 322 and transmitted with the call in step 324. The user information associated with the reference key is retrieved from a memory storage location 108 on the communication device 100 and transmitted in step 314. A default value may be indicated if no user information exists for the reference key. In another embodiment, the user information is retrieved from a network message storage area 124. The receiving station is then polled to confirm receipt of the user information in step 326.

Figure 4:
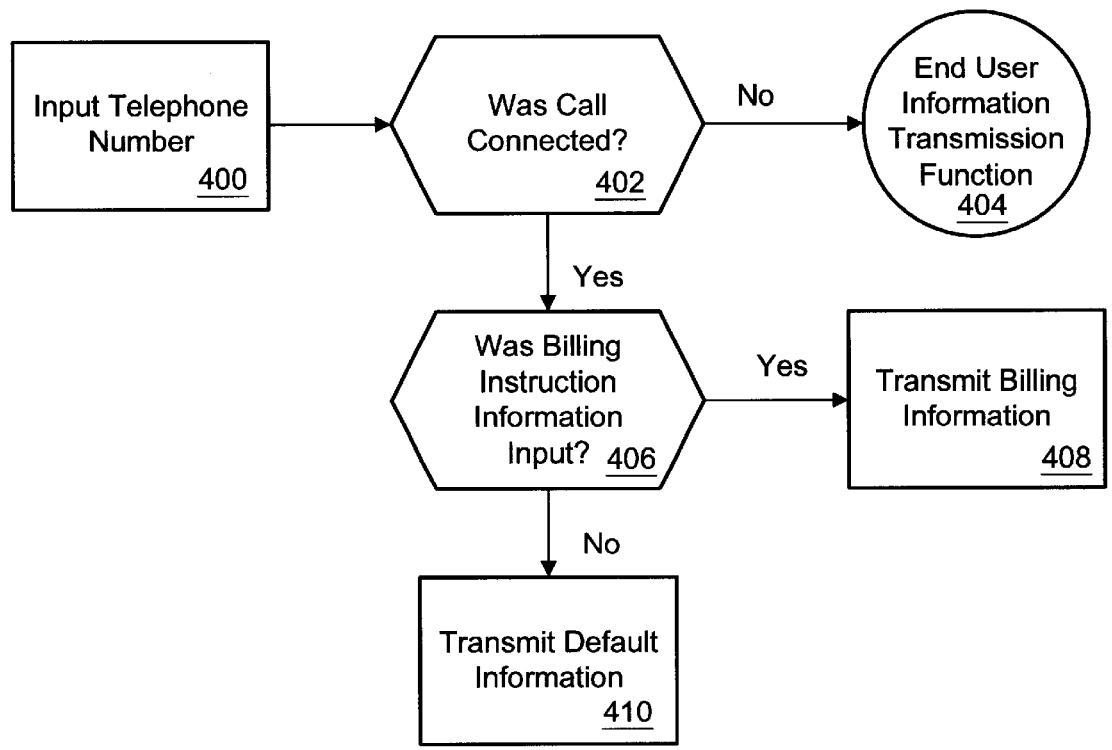
FIG. 4 is a flow diagram for sending user information for use in a billing system for the communication device shown in FIG. 1.

FIG. 4 provides another illustration of implementation of the operation of the communication device 100 to track billing information for use by a billing system. As shown, the user inputs a telephone number in step 400 to make a call using the input mechanism 102. If the call is not connected in step 402, the end user information transmission function is stopped in step 404. If the call is connected in step 402, the process moves to step 406 and any user billing information associated with the telephone number is transmitted with the call in step 408. If no billing instruction information is found, default billing information may be transmitted in step 410.

Examples of the types of billing information that may be transmitted include differentiation between billing for business and personal calls, differentiation between billing separate clients, and differentiation between billing separate employers. In each example, the billing entity receives the billing data and bills the preselected entity automatically. For example, the billing information may be associated to different users. As another example, an entity may have a pool of communication devices available to a larger pool of users. The calls made by each user are uniquely identified by the billing and calling function.

In another embodiment, transmittal of any user billing information 4in step 08 or default information in step 410 may be overridden using a reference key. In such embodiment, the user may select one reference key for personal calls and another reference key for business related calls. In another embodiment, functions without associated user billing information may not be provided with a default value and billing system 126 may then rely on an indication from a reference key value for bill tracking information.

Figure 5:
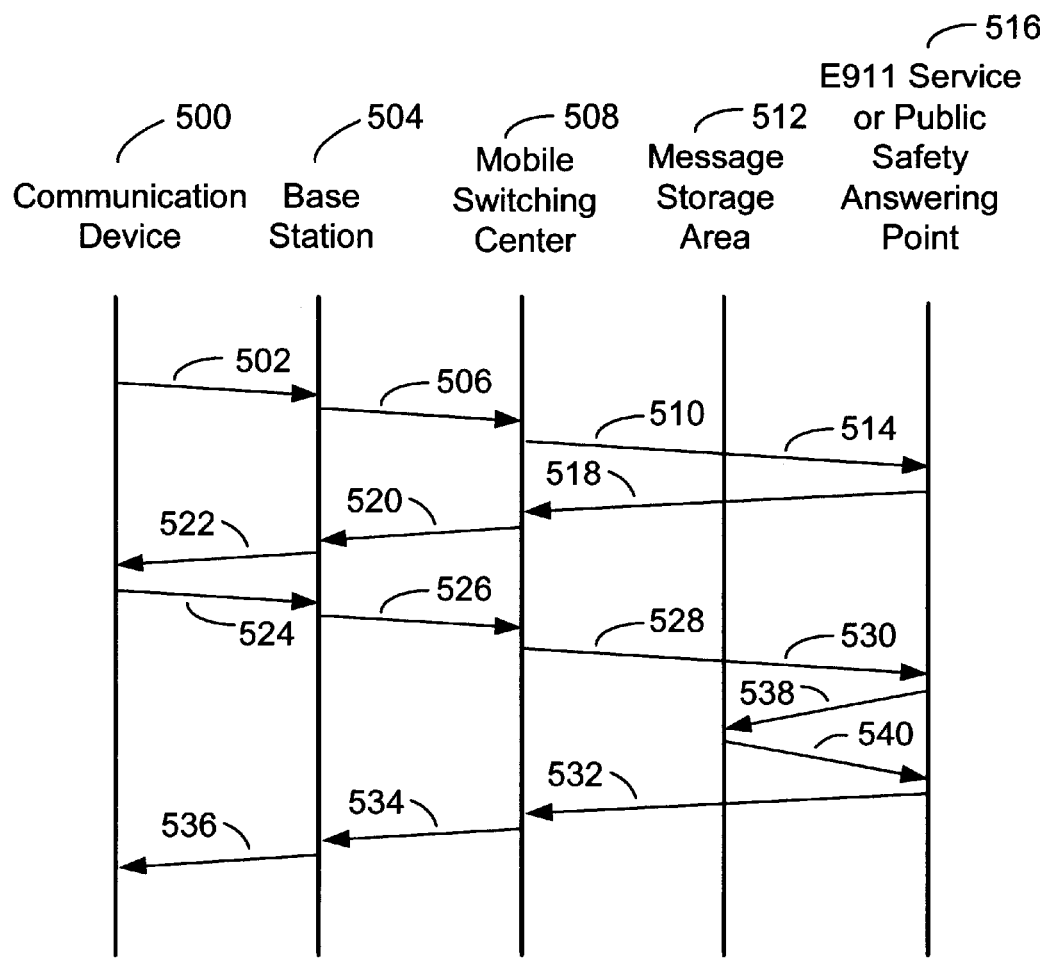
FIG. 5 is a message flow diagram illustrating a communication system for sending user information to a billing service.

FIG. 5 illustrates a progression of a call within a communication system for sending the user information to an emergency number such as 911, an E911 service, or some other public safety answering point. When a user initiates an emergency call from a communication device 500, the communication device 500 transmits call initiation messages 506 to a base station 504. Typically, the base station 504 then sends the call initiation messages 506 to a mobile switching center 508. The emergency call 510 is then routed to the emergency destination number 516 initiating the call. Once received at the intended destination number 516, an acknowledgement or request for additional data signal 518 is returned to the communication device 500 via the mobile switching center 508 and the base station 504. Once the communication device 500 receives the acknowledgement or request for information, the communication device 500 recalls from memory the user information 524, such as medical specific information, for transmission across the communication network to the emergency destination 516.

In another embodiment, the request for user information 518 may cause the communication device 500 to direct the emergency destination 516 to retrieve 538 the user information from a message storage area 512 based on information received by the emergency destination 516 during the initial call setup, after the call is set up, or at some later time. A request for the user information may be sent from the emergency destination 516 instructing the message storage area 512 to transmit the user information to the emergency destination 540. As an alternative, the communication device 500 may also instruct the message storage area 512 to transmit the user information directly to the emergency destination 516 (not shown).

Figure 6:
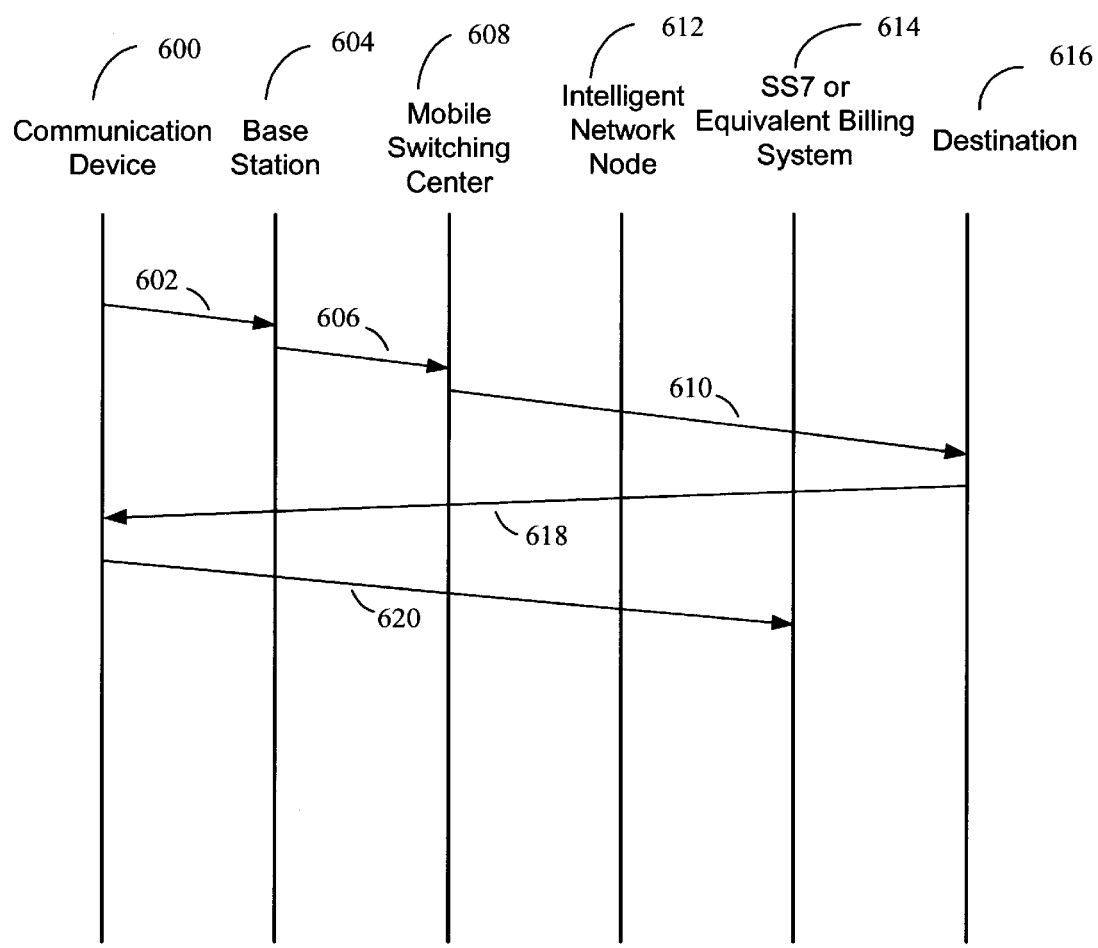
FIG. 6 is a message flow diagram illustrating a communication system for sending health information to an E911 service.

FIG. 6 illustrates a progression of a call within a communication network system for sending user information to a billing service. As shown, the user initiates a call 602 from a communication device 600 to a base station 604. The base station 604 then sends the call 606 to a mobile switching center 608 that forwards the call 610 to the destination 616. If an indication 618 shows that the call connected, the communication device 600 retrieves the user information from memory, if any, and transmits the associated user information 620 to a billing system 614.

It should be appreciated that various embodiments of the present invention may be implemented in a wireless or wireline environment. It should also be appreciated by those skilled in the art that the process shown in FIGS. 2–6 may selectively be implemented in hardware, software, or a combination of hardware and software. An embodiment of the process steps employs at least one machine-readable signal-bearing medium. Examples of machine-readable signal bearing mediums include computer-readable mediums such as a magnetic storage medium (i.e. floppy disks, or optical storage such as compact disk (CD) or digital video disk (DVD)), a biological storage medium, or an atomic storage medium, a discrete logic circuit(s) having logic gates for implementing logic functions upon data signals, an application specific integrated circuit having appropriate logic gates, a programmable gate array(s) (PGA), a field programmable gate array (FPGA), a random access memory device (RAM), read only memory device (ROM), electronic programmable random access memory (EPROM), or equivalent. Note that the computer-readable medium could even be paper or another suitable medium upon which the computer instruction is printed, as the program can be electronically captured, via for instance optical scanning of the paper or other medium, then compiled, interpreted or otherwise processed in a suitable manner if necessary, and then stored in a computer memory.

Additionally, machine-readable signal bearing medium includes computer-readable signal bearing mediums. Computer-readable signal bearing mediums have a modulated carrier signal transmitted over one or more wire based, wireless or fiber optic networks or within a system. For example, one or more wire based, wireless or fiber optic network, such as the telephone network, a local area network, the Internet, or a wireless network having a component of a computer-readable signal residing or passing through the network. The computer readable signal is a representation of one or more machine instructions written in or implemented with any number of programming languages.

Furthermore, the multiple process steps implemented utilizing a programming language, comprising an ordered listing of executable instructions for implementing logical functions, can be embodied in any machine-readable signal bearing medium. The ordered listing of executable instructions for implementing logical functions utilize by or in connection with an instruction execution system, an apparatus, or device, such as a computer-based system, controller-containing system having a processor, microprocessor, digital signal processor, discrete logic circuit functioning as a controller, or other system that can fetch the instructions from the instruction execution system, apparatus, or device and execute the instructions.

While various embodiments of the application have been described, it will be apparent to those of ordinary skill in the art that many more embodiments and implementations are possible that are within the scope of this invention.

What is claimed is:

1. A selective billing method for use by a wireless telephone, the method comprising:

accepting billing information at the wireless telephone having a memory and a plurality of input functions;

storing the billing information in the memory of the wireless telephone;

associating a billing input function of the plurality of input functions with the stored billing information;

receiving an instruction from a user indicative of the billing input function in conjunction with a telephone number of a remote communication device;

calling the telephone number of the remote communication device in response to receiving the instruction;

establishing a connection with the remote communication device;

recalling the billing information associated with the billing input function from the memory; and transmitting the billing information associated with the billing input function to a billing system using the connection.

2. The method according to claim 1 further comprising prompting the user for the billing information prior to the accepting.

3. The method according to claim 1 wherein the billing information is accepted through an interface selected from the group consisting of a keypad, a pressure sensitive touch screen, and a microphone.

4. A method of transferring medical specific information for use by a wireless telephone, the method comprising:

accepting medical specific information at the wireless telephone having a memory and a plurality of input functions;

storing the medical specific information in the memory device of the wireless telephone;

associating a medical input function of the plurality of input functions with the stored medical specific information;

receiving an instruction from a user indicative of the medical input function in conjunction with a telephone number of a remote communication device;

calling the telephone number of the remote communication device in response to receiving the instruction;

establishing a connection with the remote communication device;

recalling the medical specific information associated with the medical input function from the memory; and transmitting the medical specific information associated with the medical input function to a medical system using the connection.

5. The method according to claim 4 further comprising prompting the user for the medical specific information prior to the accepting.

6. The method according to claim 4 wherein the telephone number of the remote communication device is a 911 emergency number.

7. The method according to claim 4 wherein the medical specific information is accepted through an interface selected from the group consisting of a keypad, a pressure sensitive touch screen, and a microphone.

8. A selective billing method by a wireless telephone, the method comprising:

accepting billing information at the wireless telephone having a plurality of input functions;

transmitting the billing information to a wireless network for storage in a network message storage area;

associating a billing input function of the plurality of input functions with the stored billing information;

receiving an instruction from a user indicative of the billing input function in conjunction with a telephone number of a remote communication device;

calling the telephone number of the remote communication device in response to receiving the instruction;

establishing a connection with the remote communication device; and directing retrieval of the billing information associated with the billing input function from the network message storage area and forwarding of the billing information associated with the retrieved billing input function to a billing system.

9. The method according to claim 8 further comprising prompting the user for the billing information prior to the accepting.

10. The method according to claim 8 wherein the billing information is accepted through an interface selected from the group consisting of a keypad, a pressure sensitive touch screen, and a microphone.

11. A method of transferring medical specific information by a wireless telephone, the method comprising:

accepting medical specific information at the wireless telephone having a plurality of input functions;

transmitting the medical specific information to a wireless network for storage in a network message storage area;

associating a medical input function of the plurality of input functions with the stored medical specific information;

receiving an instruction from a user indicative of the medical input function in conjunction with a telephone number of a remote communication device;

calling the telephone number of the remote communication device in response to receiving the instruction;

establishing a connection with the remote communication device; and directing retrieval of the medical specific information associated with the medical input function from the network message storage area and forwarding of the medical specific information associated with the retrieved medical input function to a medical system.

12. The method according to claim 11 further comprising prompting the user for the medical specific information prior to the accepting.

13. The method according to claim 11 wherein the telephone number of the remote communication device is a 911 emergency number.

14. The method according to claim 11 wherein the medical specific information is accepted through an interface selected from the group consisting of a keypad, a pressure sensitive touch screen, and a microphone.

* * * * *